(12) United States Patent
Melman et al.

(10) Patent No.: US 7,796,590 B1
(45) Date of Patent: Sep. 14, 2010

(54) SECURE AUTOMATIC LEARNING IN ETHERNET BRIDGES

(75) Inventors: David Melman, D.N. Bikat Beit Hakerem (IL); Nir Arad, Nesher (IL); Tsahi Daniel, Tel-Aviv (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 1045 days.

(21) Appl. No.: 11/346,089

(22) Filed: Feb. 1, 2006

(51) Int. Cl.
*H04L 12/54* (2006.01)
(52) U.S. Cl. .................. 370/389; 370/392; 370/401; 370/428
(58) Field of Classification Search ............... 370/392, 370/395.4, 232–234, 229, 230, 401, 389, 370/230.1, 231, 235, 400, 428; 726/22; 709/223–225, 709/245
See application file for complete search history.

(56) References Cited

U.S. PATENT DOCUMENTS

| | | | | |
|---|---|---|---|---|
| 5,737,333 A * | 4/1998 | Civanlar et al. | ............. | 370/352 |
| 5,802,047 A * | 9/1998 | Kinoshita | .................... | 370/359 |
| 5,805,801 A * | 9/1998 | Holloway et al. | ............. | 726/22 |
| 6,023,563 A * | 2/2000 | Shani | ......................... | 709/249 |
| 6,279,113 B1 * | 8/2001 | Vaidya | ........................ | 726/23 |
| 6,628,653 B1 * | 9/2003 | Salim | ......................... | 370/389 |
| 6,661,787 B1 * | 12/2003 | O'Connell et al. | .......... | 370/389 |
| 7,116,672 B1 * | 10/2006 | Sivakumar | ............... | 370/395.4 |
| 7,315,554 B2 * | 1/2008 | Baum et al. | ................. | 370/469 |
| 7,333,491 B2 * | 2/2008 | Chen et al. | .................. | 370/392 |
| 7,359,389 B2 * | 4/2008 | Kusayanagi | ................ | 370/401 |
| 7,379,423 B1 * | 5/2008 | Caves et al. | ................. | 370/232 |
| 7,426,634 B2 * | 9/2008 | Jain | ........................... | 713/151 |
| 7,443,856 B2 * | 10/2008 | Lodha et al. | ................. | 370/392 |
| 7,532,604 B2 * | 5/2009 | Eglin | ......................... | 370/338 |
| 7,558,273 B1 * | 7/2009 | Grosser et al. | ......... | 370/395.53 |
| 2001/0012296 A1 * | 8/2001 | Burgess et al. | .............. | 370/392 |
| 2002/0085585 A1 * | 7/2002 | Tzeng | ........................ | 370/475 |
| 2002/0159459 A1 * | 10/2002 | Nagatomo et al. | .......... | 370/392 |
| 2003/0023733 A1 * | 1/2003 | Lingafelt et al. | ............ | 709/229 |
| 2004/0015583 A1 * | 1/2004 | Barrett et al. | ................ | 709/224 |
| 2004/0054655 A1 * | 3/2004 | Brown | .......................... | 707/1 |
| 2004/0215976 A1 * | 10/2004 | Jain | ........................... | 713/201 |
| 2005/0010817 A1 * | 1/2005 | Jakubik et al. | .............. | 713/201 |
| 2005/0125692 A1 * | 6/2005 | Cox et al. | .................... | 713/201 |
| 2005/0195819 A1 * | 9/2005 | Goto et al. | .................. | 370/392 |
| 2005/0232274 A1 * | 10/2005 | Kadambi et al. | ............ | 370/392 |
| 2006/0248229 A1 * | 11/2006 | Saunderson et al. | ........ | 709/245 |
| 2006/0288411 A1 * | 12/2006 | Garg et al. | ..................... | 726/22 |

* cited by examiner

*Primary Examiner*—Pankaj Kumar
*Assistant Examiner*—Duc T Duong

(57) ABSTRACT

A method of managing network traffic. The method includes initializing a database in communication with a network device. The database includes a number of MAC address entries and a network flooding entry associated with each of the number of MAC address entries. Each of the number of MAC address entries is associated with a station known to the network. The method also includes receiving network traffic at the network device. The network traffic is associated with a MAC source address. The method further includes determining whether the MAC source address is included in the database, automatically learning a location associated with the MAC source address, and forwarding the network traffic over the network if the MAC source address is included in the database. Additionally, the method includes dropping or trapping the network traffic if the MAC source address is not included in the database. Dropping the network traffic is performed without interaction with a CPU.

44 Claims, 4 Drawing Sheets

SECURE AUTOMATIC LEARNING IN ETHERNET BRIDGES

BACKGROUND OF THE INVENTION

The present invention relates generally to methods of maintaining network security. More particularly, the invention provides methods and systems for automatically learning new locations of known source MAC addresses. Merely by way of example, the invention has been applied to maintaining database records in a secure environment while reducing the work load of a CPU. But it would be recognized that the invention has a much broader range of applicability.

In a network environment, a network device, for example, a layer 2 bridge, contains a MAC table or forwarding database (FDB) that includes information on MAC stations connected to the network. The FDB typically contains a listing of unicast MAC addresses and an associated location for the station associated with a particular MAC address. The location of the unicast MAC address is typically a {device, port} indicator or a trunk number. The size of the FDB is a predetermined size depending on the particular applications. Merely by way of example, some layer 2 bridges have 16K FDBs. The FDB can be configured in several operational modes, such as controlled learning mode and automatic learning mode.

The controlled learning mode is utilized in some secure environments in which the network device should not automatically learn new source MAC addresses received by the device on its network ports. In controlled learning mode, when a new MAC address is seen by the device, there are several options for either forwarding or dropping the packet. In some implementations of the controlled learning mode, all packets associated with a new MAC address are dropped. In another implementation, the message is forwarded, but a message is sent to the CPU noting that the packet has a new MAC address. The CPU will attempt to authenticate the user and add the new MAC address and the location of the station to the FDB, thus learning the new MAC addresses in a controlled manner. If the new MAC address is not authenticated, the CPU does not add the address to the FDB. In yet another implementation, a packet with a new MAC address is received and the CPU is asked to authenticate the MAC address as an legitimate user and update the FDB before the packet is forwarded. A drawback associated with the controlled learning mode is that CPU resources are utilized to process every new MAC addresses that is learned. In some applications, the CPU resources are undesirably taxed during the authentication and FDB updating processes.

When the MAC address is known, but it is determined that the station is located at a new location, the station is treated as if it had a new MAC address and a message is sent to the CPU indicating that a new MAC address has been received from the given location. If authenticated, the CPU will update the existing FDB entry for this MAC address with the new location. Thus, in the controlled learning mode, the FDB content is modified and/or updated only by the initiative of the CPU.

Other network devices utilize an automatic learning mode, which operates by automatically learning each new MAC address that is seen by the network device. As a packet with a new source MAC address is received, the FDB is updated with the new MAC address and the packet is forwarded. Additionally, if a previously automatically learned MAC address has changed location, the new location of the station is automatically updated in the FDB. Of course, the automatic learning mode, which is typically used in systems with limited CPU resources, presents security problems. Thus, there is a need in the art for methods and systems adapted to provide security for the network without requiring the CPU to authenticate every new MAC address that is learned.

SUMMARY OF THE INVENTION

According to the present invention, methods of maintaining network security are provided. More particularly, the invention provides methods and systems for automatically learning new locations of known source MAC addresses, while dropping packets with unknown source MAC addresses. Merely by way of example, the invention has been applied to maintaining database records in a secure environment while reducing the work load of a CPU. But it would be recognized that the invention has a much broader range of applicability.

According to an embodiment of the present invention, a method of managing network traffic is provided. The method includes initializing a database in communication with a network device. The database includes a number of MAC address entries. Each of the number of MAC address entries is associated with a station known to the network. The database also includes a network flooding entry associated with each of the number of MAC address entries. The method also includes receiving network traffic at the network device. The network traffic is associated with a MAC source address. The method further includes determining whether the MAC source address is included in the database, automatically learning a location associated with the MAC source address and forwarding the network traffic over the network if the MAC source address is included in the database. Additionally, the method includes dropping or trapping the network traffic if the MAC source address is not included in the database. Dropping the network traffic is performed without interaction with a CPU.

According to another embodiment of the present invention, a network device is provided. The network device includes a processor and a memory in communication with the processor. The memory is adapted to a forwarding database. The forwarding database includes a number of MAC source address, VLAN pair entries associated with known stations. The forwarding database also includes a number of location entries associated with the number of MAC source address, VLAN pair entries. Updating of the number of location entries is only performed for the known stations.

According to yet another embodiment of the present invention, a method of operating a network device including a CPU is provided. The method includes receiving a network packet at a network device in communication with a network. A MAC source address is associated with the network packet. The method also includes determining if the MAC source address is present in a database. The database includes at least one MAC source address and a location associated with the at least one MAC source address. The method further includes updating the location, sending an address update message to the CPU, and forwarding the network packet over the network, if the MAC source address is present in the database. Additionally, the method includes dropping the network packet if the MAC source address is not present in the database.

According to an alternative embodiment of the present invention, a method of detecting suspicious network activity is provided. The method includes defining a threshold rate and receiving, at a processor, an address update message associated with a MAC source address present in a database. The method also includes storing, in one or more memories, an indication associated with receiving the address update message and determining if a rate associated with the indication is greater than the threshold rate. The method further includes providing an alarm if the rate associated with the indication is greater than the threshold rate.

According to another alternative embodiment of the present invention, a network device adapted to manage network traffic in a network is provided. The network device includes a memory storing a database. The database includes a number of MAC address entries. Each of the number of MAC address entries is associated with a station known to the network. The database also includes an initial network flooding entry associated with each of the number of MAC address entries. The network device also includes a processor in communication with the memory and adapted to receive network traffic at the network device. The network traffic is associated with a MAC source address. The processor is also adapted to determine whether the MAC source address is included in the database, automatically learn a location associated with the MAC source address and forward the network traffic over the network if the MAC source address is included in the database. The processor is further adapted to drop or trap the network traffic if the MAC source address is not included in the database. Dropping the network traffic is performed without interaction with a CPU.

According to yet another alternative embodiment of the present invention, a method of managing network traffic is provided. The method includes receiving network traffic at a processor and accessing a memory in communication with the processor. The memory is adapted to store a forwarding database. The forwarding database includes a number of MAC source address, VLAN pair entries associated with known stations. The forwarding database also includes a number of location entries associated with the number of MAC source address, VLAN pair entries. Updating of the number of location entries is only performed for the known stations.

According to a specific embodiment of the present invention, a network device including a CPU is provided. The network device includes an ingress port in communication with a network and adapted to receive a network packet. A MAC source address is associated with the network packet. The network also includes a database including at least one MAC source address and a location associated with the at least one MAC source address. The network device further includes a processor adapted to determine if the MAC source address is present in the database. The processor is also adapted to update the location, send an address update message to the CPU, and forward the network packet over the network, if the MAC source address is present in the database. The processor is further adapted to drop the network packet if the MAC source address is not present in the database.

According to another specific embodiment of the present invention, an apparatus for detecting suspicious network activity is provided. The apparatus includes a control engine adapted to define a threshold rate and a processor adapted to receive, at an input port, an address update message associated with a MAC source address present in a database. The apparatus also includes one or more memories adapted to store an indication associated with the received address update message and a comparator adapted to determine if a rate associated with the indication is greater than the threshold rate. The apparatus further includes an alarm generator adapted to provide an alarm if the rate associated with the indication is greater than the threshold rate.

According to a particular embodiment of the present invention, a network device adapted to manage network traffic is provided. The network device includes means for initializing a database in communication with a network device. The database includes a number of MAC address entries. Each of the number of MAC address entries is associated with a station known to the network. The database also includes a network flooding entry associated with each of the number of MAC address entries. The network device also includes means for receiving network traffic at the network device. The network traffic is associated with a MAC source address. The network device further includes means for determining whether the MAC source address is included in the database, automatically learning a location associated with the MAC source address and forwarding the network traffic over the network if the MAC source address is included in the database. Additionally, the network device includes means for dropping or trapping the network traffic if the MAC source address is not included in the database. Dropping the network traffic is performed without interaction with a CPU.

According to another particular embodiment of the present invention, a network device including a CPU is provided. The network device includes means for receiving network traffic at a processor and means for accessing a memory in communication with the processor. The memory includes means for storing a forwarding database. The forwarding database includes a number of MAC source address, VLAN pair entries associated with known stations. The forwarding database also includes a number of location entries associated with the number of MAC source address, VLAN pair entries. Updating of the number of location entries is only performed for the known stations.

According to yet another particular embodiment of the present invention, a network device including a CPU is provided. The network device includes means for receiving a network packet at a network device in communication with a network. A MAC source address is associated with the network packet. The network device also includes means for determining if the MAC source address is present in a database. The database includes at least one MAC source address and a location associated with the at least one MAC source address. The network device further includes means for updating the location, means for sending an address update message to the CPU, and means for forwarding the network packet over the network, if the MAC source address is present in the database. Additionally, the network device includes means for dropping the network packet if the MAC source address is not present in the database.

According to a particular embodiment of the present invention, an apparatus for detecting suspicious network activity is provided. The apparatus includes means for defining a threshold rate and means for receiving, at a processor, an address update message associated with a MAC source address present in a database. The apparatus also includes means for storing, in one or more memories, an indication associated with receiving the address update message and means for determining if a rate associated with the indication is greater than the threshold rate. The apparatus further includes means for providing an alarm if the rate associated with the indication is greater than the threshold rate.

Still other embodiments of the present invention may be implemented in code, for example, by a digital signal processor (DSP). One such embodiment includes code for managing network traffic. The embodiment includes code for initializing a database in communication with a network device. The database includes a number of MAC address entries. Each of the number of MAC address entries is associated with a station known to the network. The database also includes a network flooding entry associated with each of the number of MAC address entries. The embodiment also includes code for receiving network traffic at the network device. The network traffic is associated with a MAC source address. The embodiment further includes code for determining whether the MAC source address is included in the database, automatically learning a location associated with the MAC source address and forwarding the network traffic over the network if the MAC source address is included in the database. Additionally, the embodiment includes code for dropping or code for trapping the network traffic if the MAC source address is not included in the database. Dropping the network traffic is performed without interaction with a CPU.

Another embodiment implemented in code includes code for managing network traffic. The embodiment includes code for receiving network traffic at a processor and code for accessing a memory in communication with the processor. The memory is adapted to store a forwarding database. The forwarding database includes a number of MAC source address, VLAN pair entries associated with known stations. The forwarding database also includes a number of location entries associated with the number of MAC source address, VLAN pair entries. Updating of the number of location entries is only performed for the known stations.

Yet another embodiment implemented in code includes code for operating a network device including a CPU. The embodiment includes code for receiving a network packet at a network device in communication with a network. A MAC source address is associated with the network packet. The embodiment also includes code for determining if the MAC source address is present in a database. The database includes at least one MAC source address and a location associated with the at least one MAC source address. The embodiment further includes code for updating the location, code for sending an address update message to the CPU, and code for forwarding the network packet over the network, if the MAC source address is present in the database. Additionally, the embodiment includes code for dropping the network packet if the MAC source address is not present in the database.

Still another embodiment implemented in code includes code for detecting suspicious network activity. The embodiment includes code for defining a threshold rate and code for receiving, at a processor, an address update message associated with a MAC source address present in a database. The embodiment also includes code for storing, in one or more memories, an indication associated with receiving the address update message and code for determining if a rate associated with the indication is greater than the threshold rate. The embodiment further includes code for providing an alarm if the rate associated with the indication is greater than the threshold rate.

Many benefits are achieved by way of the present invention over conventional techniques. For example, embodiments of the present invention provide network security in the context of mobile network users, for example, in a wireless environment. Moreover, benefits include detection of suspicious activity when a MAC address location is changed frequently within a predetermined time window. In this case, the CPU may generate an error message or completely stop suspicious traffic. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1:
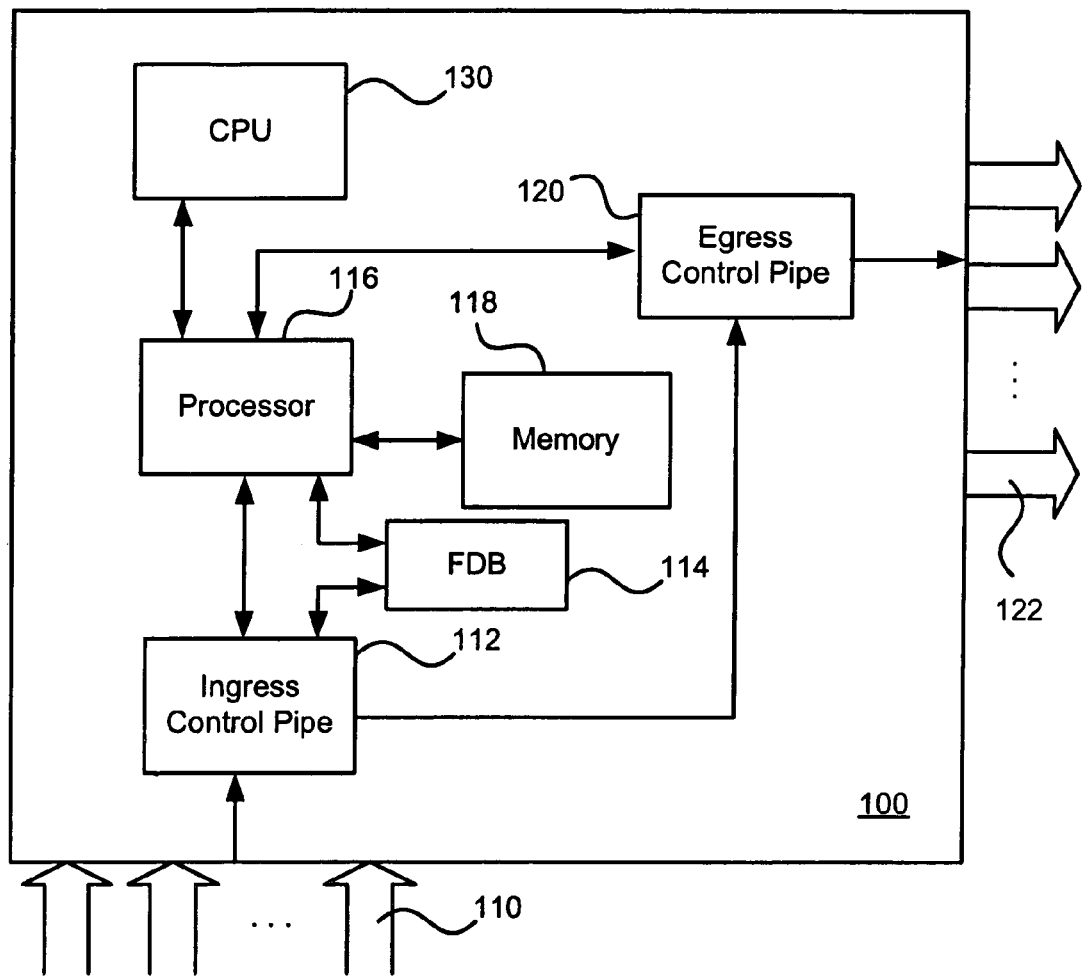
FIG. 1 is a simplified schematic illustration of a network device according to an embodiment of the present invention.

FIG. 1 is a simplified illustration of a network device according to an embodiment of the present invention. As illustrated in FIG. 1, the network device 100 may be a network switching or routing device, such as a layer 2 bridge. The network device includes a number of ingress ports 110 and an ingress control pipe 112. The network device also includes an FDB 114 coupled to a processor 116 and additional memory 118. Because multiple bridges are typically provided in a LAN, multiple instances of the FDB will be present, with one FDB stored in memory in each bridge. In some embodiments, FDB 114 is stored in memory 118, although separate memories may be provided as well as illustrated in FIG. 1. One of ordinary skill in the art would recognize many variations, modifications, and alternatives.

It is understood that processors described herein, including packet processors, may include one or more general purpose processors configured to execute instructions and data. In some embodiments, the processing of the packets may be carried out using dedicated hardware such as an application specific integrated circuit (ASIC). In yet other embodiments, the processing of the packets may be carried out using a combination of software and hardware. As an example, such processors include dedicated circuitry, ASICs, combinatorial logic, other programmable processors, combinations thereof, and the like. Thus, processors as provided herein are defined broadly and include packet processors adapted to manage network traffic, but are not limited to packet processors.

Figure 2:
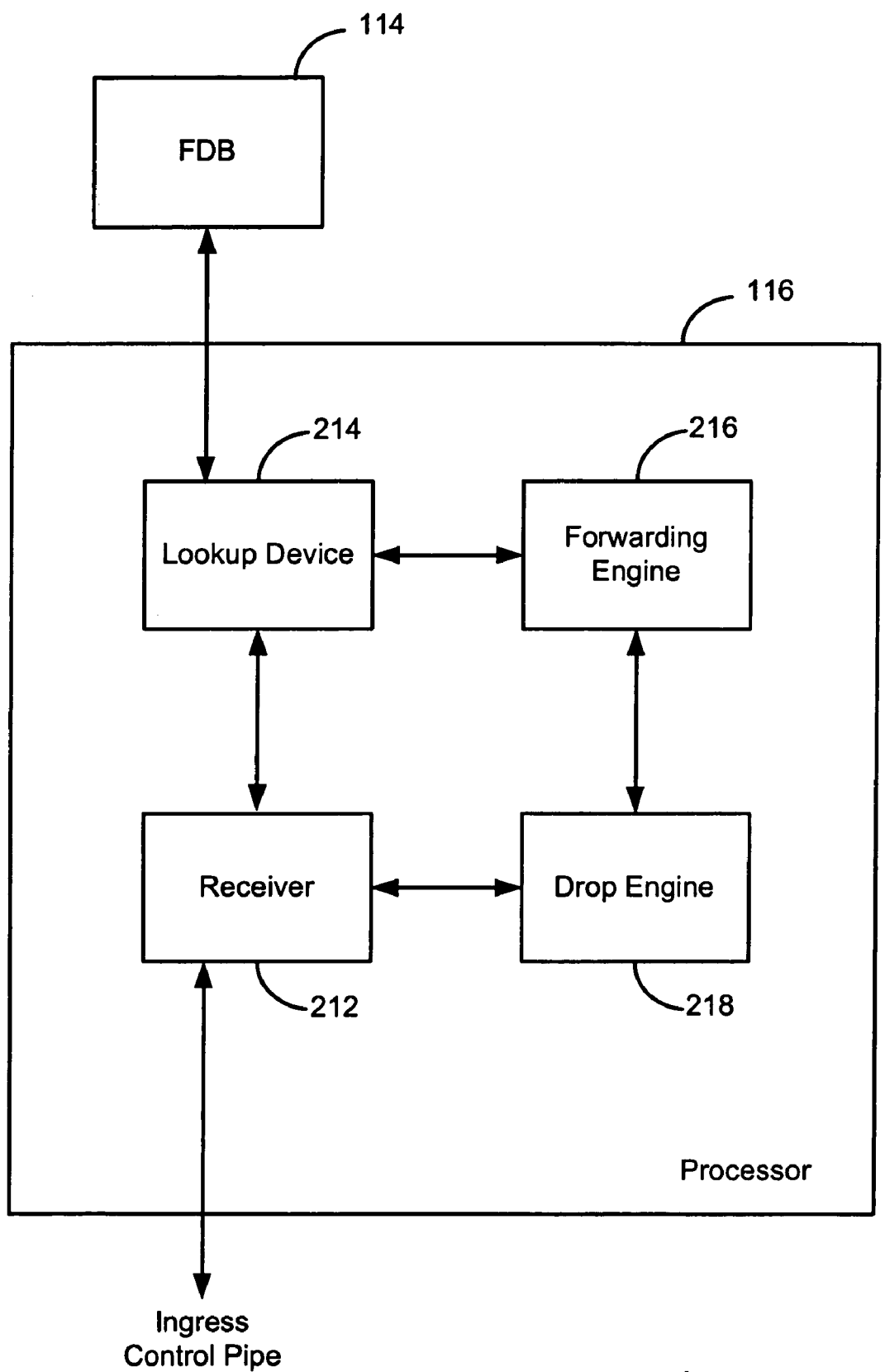
FIG. 2 is a simplified schematic illustration of a packet processor according to an embodiment of the present invention.

FIG. 2 is a simplified schematic illustration of a packet processor according to an embodiment of the present invention. Merely by way of example, the packet processor 116 includes a number of functional blocks, which may be implemented in hardware. These functional blocks include a receiver 212 and a lookup device 214. Lookup device is adapted to determine if a given MAC source address is included in FDB 114. The functional blocks further include a forwarding engine 216 and a drop engine 218, which are adapted to perform traffic management depending on the MAC source address associated with a given packet. Although not illustrated in FIG. 2, the processor may provide for trapping of the packet to the CPU 130 for logging or analysis by additional hardware or software.

As illustrated in FIG. 1, the network device 100 includes a CPU 130 in communication with the processor 116. Additional interconnections between the CPU and other device elements, such as FDB 114, are omitted for purposes of clarity. An egress control pipe 120 and a number of egress ports 122 are also included in the network device. As will be evident to one of skill in the art, the simplified illustration provided in FIG. 1 omits various elements for purposes of clarity. Accordingly, embodiments of the present invention are not limited to the illustrations shown in FIG. 1 but include elements that are added, removed, combined, or separated.

In a network environment, the network manager maintains a database of known MAC source addresses in the manager's network. The database, such as an FDB, provides storage locations for {MAC source address, VLAN} pairs, and associated locations. Typically, the data for the FDB is learned dynamically as traffic is received. According to embodiments of the present invention, the CPU 130 performs a one-time initialization of the FDB with the approved MAC source addresses, with each approved MAC source address initially configured to be flooded to its VLAN domain. As will be evident to one of skill in the art, in many network environments, particularly with mobile users, the locations or ports at which the stations are located is modified over time. Thus, at any given point in time, an approved MAC address may be associated with one of several locations. Merely by way of example, a person working in an office on a laptop computer during the day would have a first location associated with the MAC address of their computer NIC during the day and a second location associated with this MAC address when working at home during the evening.

Thus the MAC source addresses are loaded by the CPU into the FDB at initialization with the VLAN flood domain as the forwarding destination. As an example, a flag in the database entry for the MAC source address may be used to indicate that the packet is to be flooded to the VLAN, rather than forwarded to a specific location ({device, port}/trunk group). Thus, at initialization, the default location entry for each of the known MAC source addresses is "Flood to VLAN." Based on this location entry, as packets initially arrive at the network device, the packets are flooded to the VLAN. Over time, as traffic is received from the network, the locations of known MAC addresses are determined and the FDB is updated accordingly. As traffic is received from legitimate. MAC source addresses at a specific location (e.g., {port, device}, trunk group) are learned and their locations are updated in the FDB. Accordingly, the flag in the entry is reset to indicate forwarding of the traffic to the specific location. Thus, the number of FDB entries with "Flood to VLAN" stored in the location field will preferably decrease in time, improving network efficiency. Accordingly, automatic learning of known MAC source address locations is provided by embodiments of the present invention.

In contrast with the secure automatic learning mode discussed above, traffic associated with unknown MAC source addresses is dropped or trapped to the CPU. As an example, a global Secure Automatic Learning Unknown Source command is assigned to the packet (e.g., TRAP, DROP, and the like). Additionally, the packet is treated as a security breach event, which allows the CPU to see the MAC SA, VLAN, and source port of the unauthorized packet. Typically, when the packet is dropped, it is counted by a counter provided by the network device. Thus, the network manager is able to control access to the network and provide system security by dropping network traffic not associated with a known MAC source address. Because the packets associated with unknown MAC addresses are not forwarded through the network, security is enhanced. For example, an intruder who attempts to physically connect to the network is unable to communication with the other nodes in the network, since the intruder's MAC source address is not listed in the FDB and all traffic from the intruder is dropped.

Thus, embodiments of the present invention provide a global mode of automatically learning the location of known MAC source addresses in a secure environment. For network applications with mobile users, for example, it is desirable to provide for automatic learning as the locations of known MAC addresses change, thus not requiring any intervention by the controlling CPU. Accordingly, as a packet is received and the source address FDB entry is found, the current location of the legitimate station is learned by modifying the initial "Flood to VLAN" entry to the specific location (e.g., {device, port} or trunk location).

Moreover, as a known/approved MAC address is moved from location to location, the network device is able to relearn the new location in a dynamic manner. As an example, the FDB is updated to replace an old location (e.g., {port, device}) with a new location as a result of seeing the traffic in the network. The dynamic relearning of known MAC address locations is performed in hardware without relying on the involvement of the CPU, providing the benefits of automatic learning processes while also providing for network security.

Figure 3:
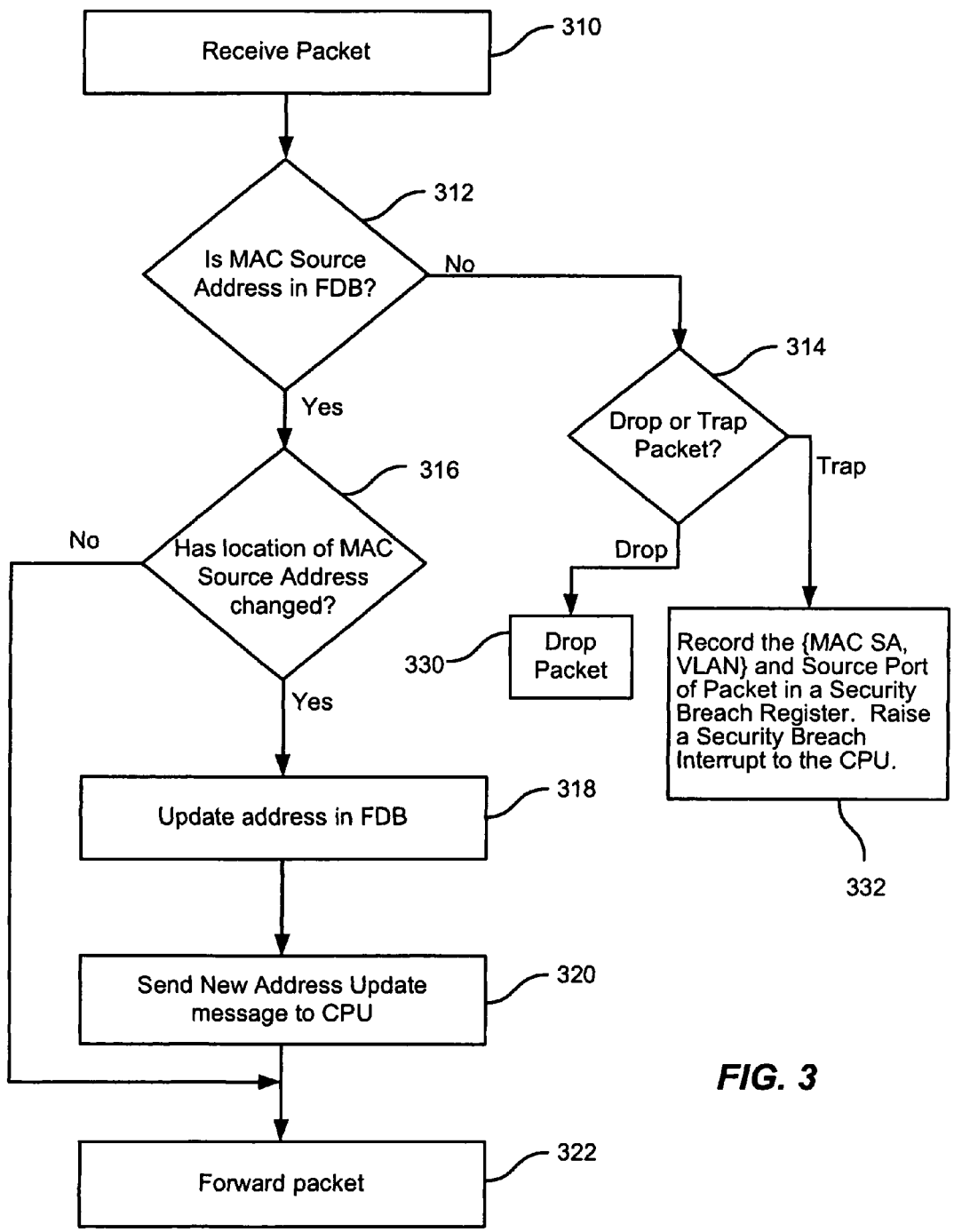
FIG. 3 is a simplified flowchart illustrating a method of updating a forwarding database with a MAC address location according to an embodiment of the present invention.

FIG. 3 is a simplified flowchart illustrating a method of updating a FDB with a MAC address location according to an embodiment of the present invention. A packet is received (310) at a port of a network device, for example, a layer 2 bridge. A determination is made (312) of whether the MAC source address is present in the FDB. If the MAC source address is an unknown or new address and therefore not found in the FDB, a determination is made (314) of whether the packet is to be dropped or trapped to the CPU. Depending on the decision (314), the packet is dropped (330) or trapped to the CPU (332). As shown in FIG. 3, trapping of the packet to the CPU includes recording the {MAC source address, VLAN} pair and the source port of the packet in a Security Breach Register. Additionally, as illustrated in FIG. 3, a security breach interrupt is raised to the CPU. Although not illustrated, dropping of the packet may result in a security breach event, which entails recording the {MAC SA, VLAN} and ingress port in CPU readable registers and raising the Security Breach Interrupt to the CPU. Additional analysis by hardware or software (e.g., the CPU) may be performed as appropriate to the particular application.

If the MAC source address of the packet is present in the FDB, then a determination is made of whether the location of the station associated with the MAC source address has changed (316) by comparing the present location with the location information stored in the FDB. As described above, the initial location entry in the FDB for all known MAC addresses is "Flood to VLAN." Accordingly, if the station is newly connected to the network and authorized by the network manager, the initial "Flood to VLAN" entry will be replaced with the present address of the station (318). If a specific location entry is present in the FDB and the station has moved to a new location, this new location is updated in the FDB (318). After the address is updated in the FDB, a New Address Update message will be sent to the CPU (320). Then the packet will be forwarded (322) to the network. If the source MAC address is in the FDB (312) and the location of the station has not changed (316), then the packet is forwarded to the network. In an embodiment, if the source MAC SA is found in the FDB, the packet is still forwarded, regardless of whether or not its location has changed.

The above sequence of steps provides a method of providing secure automatic learning in a network environment according to an embodiment of the present invention. As shown, the method uses a combination of steps including a way of filtering traffic based on whether or not the source MAC is present in a database managed by a network manager. Other alternatives can also be provided where steps are added, one or more steps are removed, or one or more steps are provided in a different sequence without departing from the scope of the claims herein. One of ordinary skill in the art would recognize many variations, modifications, and alternatives.

One of skill in the art will appreciate that embodiments of the present invention provide methods and systems in which a MAC addresses will only be automatically learned if the MAC address already resides in the FDB. Otherwise, the traffic associated with the unknown MAC address is dropped. Accordingly, network security is provided by only automatically learning known addresses while reducing the burden on the CPU by implementation of the secure automatic learning mode.

As discussed in relation to FIG. 3, when the FDB entry for a known MAC source address is modified with the new location of the station, a New Address Update message is sent to the CPU (320). In embodiments of the present invention, the CPU is adapted to perform processing of these New Address Update messages to keep an updated image of the current FDB content and detect suspicious activity. As an example, the following description illustrates a method of using New Address Update messages to track the location of a station associate with a MAC address and generate an appropriate alarm.

Figure 4:
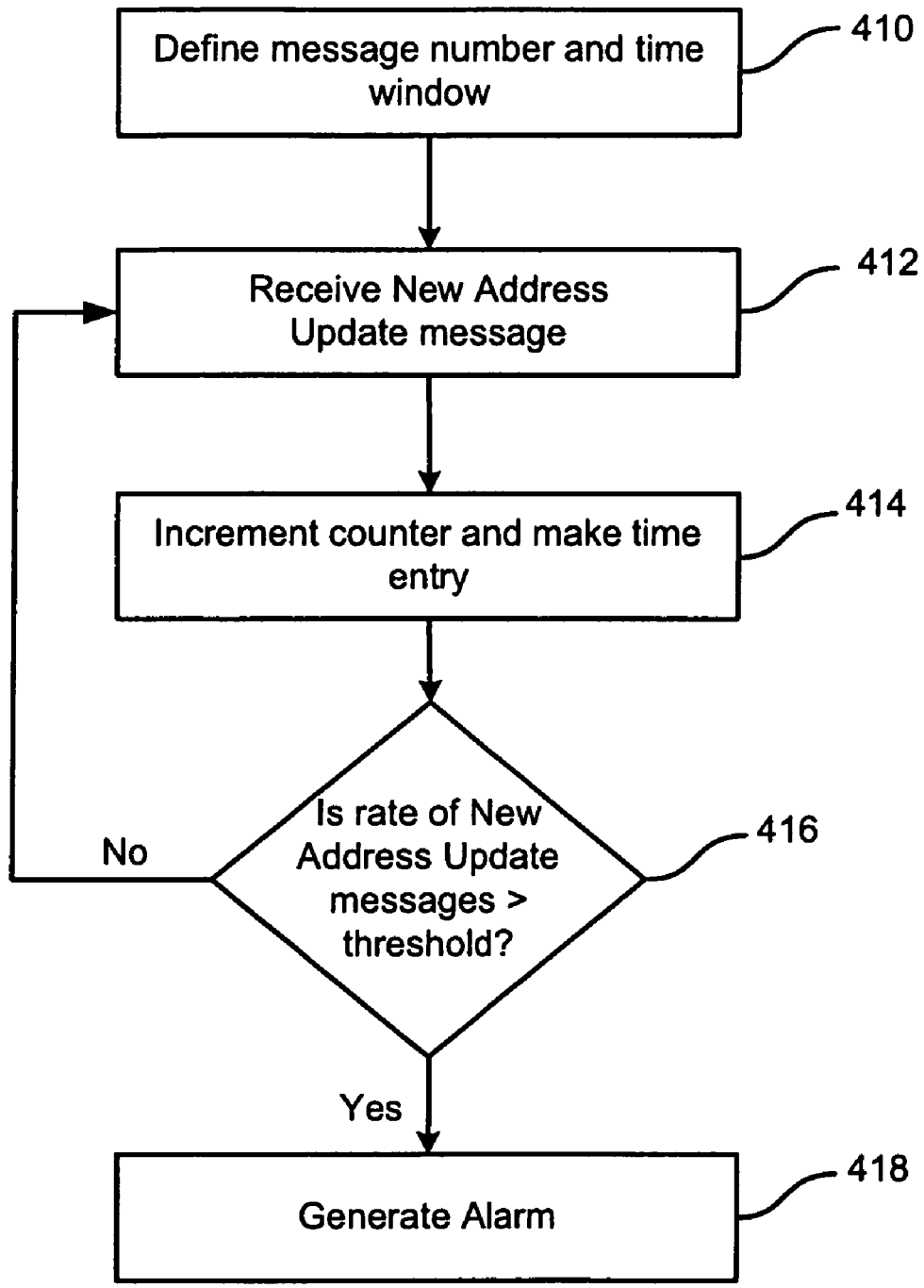
FIG. 4 is a simplified flowchart illustrating a method of detecting suspicious network activity according to an embodiment of the present invention.

FIG. 4 is a simplified flowchart illustrating a method of detecting suspicious network activity according to an embodiment of the present invention. A number of messages and a time window are defined (410), typically by a network manager. These values will be used to determine a threshold rate. For instance, the threshold rate may be defined by five location changes in a time window of 60 minutes. This threshold rate will be used by the CPU in subsequent steps as more fully described below. The CPU receives a New Address Update message associated with a known MAC address (412). A counter is incremented and one or more time entries are made (414), for example, in a database containing a listing of MAC addresses, time entries, and a counter entry.

The CPU determines (416) if the rate at which the New Address Update messages have been received is greater than the threshold rate. In a particular embodiment, as illustrated above, the threshold rate at which the messages are received may be five messages in a one hour period. Of course, the particular threshold rate will depend on the particular applications. If the rate at which messages have been received is less than the threshold rate, the CPU will wait for the next New Address Update message (412). If, on the other hand, the threshold rate is exceeded, the CPU will generate an alarm (418). Examples of alarms include, but are not limited to generating an error message, stopping traffic associated with the particular MAC address, and the like. One of ordinary skill in the art would recognize many variations, modifications, and alternatives.

The above sequence of steps provides a method of detecting suspicious network activity according to an embodiment of the present invention. As shown, the method uses a combination of steps including a way of comparing a number of New Address Update messages received in a given time window to a predetermined threshold value. Other alternatives can also be provided where steps are added, one or more steps are removed, or one or more steps are provided in a different sequence without departing from the scope of the claims herein. For example, the predetermined threshold rate may vary as a function of time or as a function of traffic level. One of ordinary skill in the art would recognize many variations, modifications, and alternatives.

Embodiments of the present invention also provide for aging modes in combination with secure automatic learning modes. As discussed above, the locations entries in the FDB are preferably associated with a particular location of the MAC station. After time, the MAC address may become idle or become inactive. In conventional network systems, aging is performed by removing the MAC address from the FDB. In contrast with this conventional procedure, embodiments of the present invention perform aging by maintaining the known MAC address entry in the FDB while restoring the location associated with the MAC address back to the default entry of "Flood to the VLAN." This aging process can be considered as similar to a reinitialization process for the particular MAC address undergoing aging. Thus, once the known MAC address is aged, future traffic destined to the destination address will initially be flooded to the network (e.g., VLAN). As the location of the station is learned, the actual location of the station will be automatically learned as described more fully through the present specification.

An alternative mode of aging does not modify the location entry in the FDB, but sends and Aged Address message to the CPU. In this mode, the CPU can perform the entry modification if desired. Moreover, as an option, an FDB aging pass can be invoked automatically at a predetermined interval. Alternatively, the CPU can trigger a single FDB aging pass at any desired frequency. The aging pass can be configured to age all the non-static and non-IPv4/6 MAC Unicast/Multicast FDB entries, or the aging pass may be restricted to act only on a configured subset of the non-static non-IPv4/6 MAC Unicast/Multicast FDB entries associated with configured VLAN-ID and/or device number. One of ordinary skill in the art would recognize many variations, modifications, and alternatives.

The above description of exemplary embodiments of the invention has been presented for the purposes of illustration and description. It is not intended to be exhaustive or to limit the scope of the invention, which is set forth in the following claims, to the precise form described. Many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of managing network traffic, the method comprising:
   initializing a database in communication with a network device, wherein the database comprises:
      a plurality of MAC address entries, wherein each of the plurality of MAC address entries is associated with a station known to the network, and
      a network flooding entry associated with each of the plurality of MAC address entries;
   receiving network traffic at the network device, wherein the network traffic is associated with a MAC source address;
   determining whether the MAC source address is included in the database;
   automatically learning, without interaction from a CPU, a location associated with the MAC source address if the MAC source address is included in the database;
   forwarding the network traffic over the network if the MAC source address is included in the database; and
   dropping or trapping the network traffic if the MAC source address is not included in the database, wherein dropping the network traffic is performed without interaction with a CPU.

2. The method of claim 1 further comprising:
   recording at least the MAC source address in a security breach register; and
   raising a security breach interrupt to the CPU.

3. The method of claim 1 wherein automatically learning comprises:
   determining the location associated with the MAC source address; and updating the database to include the location associated with the MAC source address.

4. The method of claim 3 wherein updating the database comprises overriding the network flooding entry with the location associated with the MAC source address.

5. The method of claim 4 further comprising:
determining that the MAC source address is associated with a new location; and
updating the database to include the new location associated with the MAC source address.

6. The method of claim 3 further comprising:
determining that the MAC source address is appropriate for an aging process; and
performing the aging process by reinitializing the database to include the network flooding entry associated with the MAC source address.

7. The method of claim 1 wherein the plurality of MAC address entries are associated with a plurality of authorized stations.

8. The method of claim 1 wherein the network flooding entry is a "Flood to VLAN entry.

9. The method of claim 1 wherein the network device is a bridge.

10. A network device comprising:
a processor; and
a memory in communication with the processor and storing a forwarding database therein, the forwarding database including:
a plurality of MAC source address, VLAN pair entries associated with known stations; and
a plurality of location entries associated with the plurality of MAC source address, VLAN pair entries, wherein the processor is configured to update location entries only for the known stations and without adding MAC source addresses to the forwarding database in response to network traffic with unknown MAC source addresses and associated with unknown stations.

11. The network device of claim 10 wherein network traffic associated with unknown stations is dropped without interaction with a CPU.

12. The network device of claim 10 wherein network traffic associated with unknown stations is trapped to a CPU.

13. The network device of claim 10 wherein the network device is a bridge.

14. The network device of claim 10 wherein an aging process modifies a location entry associated with a MAC address, VLAN pair by reinitializing the location entry to a network flooding entry.

15. The network device of claim 10 wherein the processor comprises an application specific integrated circuit.

16. A method of operating a network device including a CPU, the method comprising:
initializing a database to include a flood to VLAN indicator for each MAC source address;
receiving a network packet at a network device in communication with a network, wherein a MAC source address is associated with the network packet;
determining if the MAC source address is present in the database, wherein the database comprises at least one MAC source address and a location associated with the at least one MAC source address;
determining the location associated with the MAC source address if the MAC source address is present in the database;
in response to determining the location associated with the MAC source address, updating the location in the database and removing the flood to VLAN indicator independently of the CPU, and sending an address update message to the CPU;
forwarding the network packet over the network if the MAC source address is present in the database; and
dropping the network packet or trapping the network packet to the CPU, if the MAC source address is not present in the database.

17. The method of claim 16 wherein the database comprises a forwarding database.

18. The method of claim 16 further comprising:
determining that the MAC source address is appropriate for an aging process; and
performing the aging process by reinitializing the database to include a network flooding entry associated with the MAC source address.

19. A method of detecting suspicious network activity, the method comprising:
defining a threshold rate as a number of received messages in a predetermined time window;
receiving, at a processor, an address update message associated with a MAC source address present in a database;
storing, in one or more memories, an indication associated with receiving the address update message;
determining if a received address update message rate, based on the stored indication, is greater than the threshold rate; and
providing an alarm if the rate associated with the indication is greater than the threshold rate.

20. The method of claim 19 wherein the processor is a CPU in a network device.

21. The method of claim 19 wherein the indication comprises a counter entry and one or more time entries.

22. The method of claim 19 wherein providing an alarm comprises stopping traffic associated with the MAC source address.

23. A network device to manage network traffic in a network, the network device comprising:
a memory storing a database, wherein the database comprises:
a plurality of MAC address entries, wherein each of the plurality of MAC address entries is associated with a station known to the network, and
an initial network flooding entry associated with each of the plurality of MAC address entries; and
a processor to:
receive network traffic at the network device, wherein the network traffic is associated with a MAC source address;
determine whether the MAC source address is included in the database;
automatically learn, without interaction from a CPU, a location associated with the MAC source address if the MAC source address is included in the database;
forward the network traffic over the network if the MAC source address is included in the database; and
drop or trap the network traffic if the MAC source address is not included in the database, wherein dropping the network traffic is performed without interaction with a CPU.

24. The network device of claim 23 wherein the processor is further to:
record at least the MAC source address in a security breach register; and
raise a security breach interrupt to the CPU.

25. The network device of claim 23 wherein automatically learning comprises:

determining the location associated with the MAC source address; and updating the database to include the location associated with the MAC source address.

26. The network device of claim 25 wherein updating the database comprises overriding the network flooding entry with the location associated with the MAC source address.

27. The network device of claim 26 further comprising:
determining that the MAC source address is associated with a new location; and
updating the database to include the new location associated with the MAC source address.

28. The network device of claim 25 further comprising:
determining that the MAC source address is appropriate for an aging process; and
performing the aging process by reinitializing the database to include the network flooding entry associated with the MAC source address.

29. The network device of claim 23 wherein the plurality of MAC address entries are associated with a plurality of authorized stations.

30. The network device of claim 23 wherein the network flooding entry is a "Flood to VLAN" entry.

31. The network device of claim 23 wherein the network device is a bridge.

32. A method of managing network traffic, the method comprising:
receiving network traffic at a processor; and
accessing a memory in communication with the processor, wherein the memory is to store a forwarding database, the forwarding database including:
a plurality of MAC source address, VLAN pair entries associated with known stations; and
a plurality of location entries associated with the plurality of MAC source address, VLAN pair entries, wherein updating of the plurality of location entries is only performed for the known stations and without adding MAC source addresses to the forwarding database in response to network traffic with unknown MAC source addresses and associated with unknown stations.

33. The method of claim 32 wherein network traffic associated with unknown stations is dropped without interaction with a CPU.

34. The method of claim 32 wherein network traffic associated with unknown stations is trapped to a CPU.

35. The method of claim 32 wherein the network device is a bridge.

36. The method of claim 32 wherein an aging process modifies a location entry associated with a MAC address, VLAN pair by reinitializing the location entry to a network flooding entry.

37. The network device of claim 32 wherein the processor comprises an application specific integrated circuit.

38. A network device including a CPU, the network device comprising:

an ingress port in communication with a network and to receive a network packet, wherein a MAC source address is associated with the network packet;

a database comprising at least one MAC source address, a flood to network entry for each MAC source address, and a location associated with the at least one MAC source address; and a processor to:
determine if the MAC source address is present in the database;
determine the location associated with the MAC source address if the MAC source address is present in the database;
in response to determining the location associated with the MAC source address, update the location in the database independently of the CPU, remove the flood to VLAN entry independently of the CPU, and send an address update message to the CPU;
forward the network packet over the network if the MAC source address is present in the database; and
drop the network packet or trap the network packet to the CPU, if the MAC source address is not present in the database.

39. The network device of claim 38 wherein the database comprises a forwarding database.

40. The network device of claim 38 wherein the processor is further adapted to:
determine that the MAC source address is appropriate for an aging process; and
perform the aging process by reinitializing the database to include a network flooding entry associated with the MAC source address.

41. An apparatus for detecting suspicious network activity, the apparatus comprising:
a control engine adapted to define a threshold rate as a number of received messages in a predetermined time window;
a processor to receive, at an input port, an address update message associated with a MAC source address present in a database;
one or more memories to store an indication associated with the received address update message;
a comparator to determine if a received address update message rate, based on the stored indication, is greater than the threshold rate; and
an alarm generator to provide an alarm if the rate associated with the indication is greater than the threshold rate.

42. The method of claim 41 wherein the processor is a CPU in a network device.

43. The method of claim 41 wherein the indication comprises a counter entry and one or more time entries.

44. The method of claim 41 wherein the alarm comprises stopping traffic associated with the MAC source address.

* * * * *